United States Patent
Ha et al.

(10) Patent No.: US 11,437,839 B2
(45) Date of Patent: *Sep. 6, 2022

(54) METHOD OF CONTROLLING CHARGING OF PLURALITY OF BATTERIES AND ELECTRONIC DEVICE TO WHICH THE METHOD IS APPLIED

(71) Applicant: Samsung Electronics Co., Ltd., Suwon-si (KR)

(72) Inventors: Youngmi Ha, Suwon-si (KR); Seungbeom Kang, Suwon-si (KR); Kyounghoon Kim, Suwon-si (KR); Daeneung Kim, Suwon-si (KR); Duhyun Kim, Suwon-si (KR); Byungwook Kim, Suwon-si (KR); Boeun Lee, Suwon-si (KR); Jungmin Lee, Suwon-si (KR); Sungjoon Cho, Suwon-si (KR); Jaemu Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

This patent is subject to a terminal disclaimer.

(21) Appl. No.: 16/707,446

(22) Filed: Dec. 9, 2019

(65) Prior Publication Data
US 2020/0251920 A1 Aug. 6, 2020

(30) Foreign Application Priority Data
Jan. 31, 2019 (KR) .................. 10-2019-0012352

(51) Int. Cl.
*H02J 7/04* (2006.01)
*H02J 7/16* (2006.01)
*H02J 7/00* (2006.01)

(52) U.S. Cl.
CPC ...... *H02J 7/007194* (2020.01); *H02J 7/0047* (2013.01); *H02J 7/00714* (2020.01)

(58) Field of Classification Search
CPC .............................. H02J 7/007194
(Continued)

(56) References Cited

U.S. PATENT DOCUMENTS 3,895,283 A * 7/1975 Peterson ........... H02J 7/007194
322/33
5,166,596 A 11/1992 Goedken
(Continued)

FOREIGN PATENT DOCUMENTS

EP 3 422 529 A1 2/2019
JP H06-502984 A 3/1994
(Continued)

OTHER PUBLICATIONS

International Search Report dated Apr. 29, 2020; International Appln. No. PCT/KR2019/017070.
(Continued)

*Primary Examiner* — Yalkew Fantu
(74) *Attorney, Agent, or Firm* — Jefferson IP Law, LLP

(57) ABSTRACT

An electronic device is provided. The electronic device includes a housing, a first battery and a second battery arranged in the housing, a power management module, a first temperature sensor, a second temperature sensor, a first current limiting integrated circuit (IC) configured to limit a maximum intensity of a first current flowing into the first battery, a second current limiting IC configured to limit a maximum intensity of a second current flowing into the second battery, and a processor. The processor may determine whether the first temperature or the second temperature is outside a specified temperature range and, when the first temperature is outside of the specified temperature range,
(Continued)

control the first current limiting IC to reduce a magnitude of the first current.

17 Claims, 8 Drawing Sheets

(58) Field of Classification Search
USPC .......................................................... 320/150
See application file for complete search history.

(56) References Cited

U.S. PATENT DOCUMENTS

| | | | |
|---|---|---|---|
| 5,440,221 A | | 8/1995 | Landau et al. |
| 6,188,202 B1 * | | 2/2001 | Yagi ........................ B60L 58/12 |
| | | | 320/150 |
| 10,122,188 B2 | | 11/2018 | Eo et al. |
| 2002/0079866 A1 * | | 6/2002 | Odaohhara ......... H02J 7/00309 |
| | | | 320/150 |
| 2013/0069594 A1 | | 3/2013 | Jung |
| 2013/0140886 A1 | | 6/2013 | Bito |
| 2015/0035495 A1 | | 2/2015 | Yoshida |
| 2017/0250548 A1 | | 8/2017 | Eo et al. |
| 2018/0316207 A1 * | | 11/2018 | Irish ...................... H02J 7/0014 |
| 2019/0006722 A1 | | 1/2019 | Kim et al. |
| 2020/0266499 A1 * | | 8/2020 | Ha ........................ H02J 7/0013 |
| 2020/0266627 A1 * | | 8/2020 | Ha ...................... H02J 7/00718 |

FOREIGN PATENT DOCUMENTS

| | | |
|---|---|---|
| JP | 2014-176141 A | 9/2014 |
| JP | 6174963 B2 | 8/2017 |
| KR | 10-1998-0012777 A | 4/1998 |
| KR | 10-1428763 B1 | 8/2014 |
| KR | 10-1569484 B1 | 11/2015 |
| KR | 10-2017-0100355 A | 9/2017 |

OTHER PUBLICATIONS

European Search Report dated Nov. 2, 2021, issued in European Application No. 19913286.1.

* cited by examiner

METHOD OF CONTROLLING CHARGING OF PLURALITY OF BATTERIES AND ELECTRONIC DEVICE TO WHICH THE METHOD IS APPLIED

CROSS-REFERENCE TO RELATED APPLICATION(S)

This application is based on and claims priority under 35 U.S.C. § 119(a) of a Korean patent application number 10-2019-0012352, filed on Jan. 31, 2019, in the Korean Intellectual Property Office, the disclosure of which is incorporated by reference herein its entirety.

BACKGROUND

1. Field

The disclosure relates to a method of controlling charging of a plurality of batteries and a technology for implementing an electronic device to which the method is applied.

2. Description of Related Art

An electronic device may operate for a specified time while separated from an external power source by using a battery. When the electronic device is connected to an external power source, the battery may be charged. When the electronic device is separated from the external power source, the battery may be discharged to operate the electronic device.

The electronic device may operate using a plurality of batteries. The electronic device may operate using power stored in at least one of the plurality of batteries. A balancing operation may occur between a plurality of batteries connected to each other to balance the levels of the batteries. Current may flow from the high level battery to the low level battery due to the balancing operation.

The above information is presented as background information only to assist with an understanding of the disclosure. No determination has been made, and no assertion is made, as to whether any of the above might be applicable as prior art with regard to the disclosure.

SUMMARY

Because the power management integrated circuit of an electronic device of the related art continues to charge a plurality of batteries until the plurality of batteries are all fully charged, the first fully charged battery among the batteries may be overcharged. Such overcharging may cause battery heating and/or battery damage.

In addition, the temperatures of the batteries may change differently from each other according to the use environment and/or the battery use state of the electronic device. The temperature of each of the plurality of batteries may not be measured and/or identified, so that it may not be easy to control the charging mode of each of the plurality of batteries and/or whether to charge each of the plurality of batteries.

In addition, when the balancing operation occurs in an electronic device, charging and/or discharging may be performed in each of the plurality of batteries. Power loss may occur while charging and/or discharging is performed in each of the plurality of batteries.

Aspects of the disclosure are to address at least the above-mentioned problems and/or disadvantages and to provide at least the advantages described below. Accordingly, an aspect of the disclosure is to provide a method of controlling charging a plurality of batteries based on temperatures of batteries and an electronic device employing the same method.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a plurality of batteries arranged in the housing, a power management module that controls the plurality of batteries, a plurality of temperature sensors that measures temperatures of the plurality of batteries, respectively, a plurality of current limiting integrated circuits (ICs) that limits a maximum intensity of current flowing into each of the plurality of batteries, and a processor that is operationally connected to the plurality of batteries, the power management module, the plurality of temperature sensors, and the plurality of current limiting ICs, wherein the processor may determine whether a temperature of each of the plurality of batteries is outside a specified temperature range, and reduce an intensity of a current flowing into a battery of the plurality of batteries that has a temperature outside the specified temperature range by using the plurality of current limiting ICs.

In accordance with another aspect of the disclosure, a method of controlling charging of a plurality of batteries is provided. The method includes measuring temperatures of the plurality of batteries, respectively by using a plurality of temperature sensors, determining whether the temperature of each of the plurality of batteries is outside a specified temperature range, and reducing an intensity of a current flowing into a battery of the plurality of batteries that has a temperature outside the specified temperature range by using a plurality of current limiting ICs for limiting a maximum intensity of a current flowing into each of the plurality of batteries.

In accordance with still another aspect of the disclosure, an electronic device is provided. The electronic device includes a housing, a plurality of batteries arranged in the housing, a power management module that controls the plurality of batteries, a plurality of temperature sensors that measures temperatures of the plurality of batteries, respectively, a plurality of current limiting ICs that limit a maximum intensity of current flowing into each of the plurality of batteries, and a processor operationally connected to the plurality of batteries, the power management module, the plurality of temperature sensors, and the plurality of current limiting ICs, wherein the processor may charge a battery having a temperature within a specified temperature range among the plurality of batteries at a first speed, charge a battery having a temperature outside the specified temperature range among the plurality of batteries at a second speed slower than the first speed by using the plurality of current limiting ICs, and block charging by using the plurality of current limiting ICs when a difference value between a highest temperature and a lowest temperature of the plurality of batteries is equal to or greater than a threshold difference value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
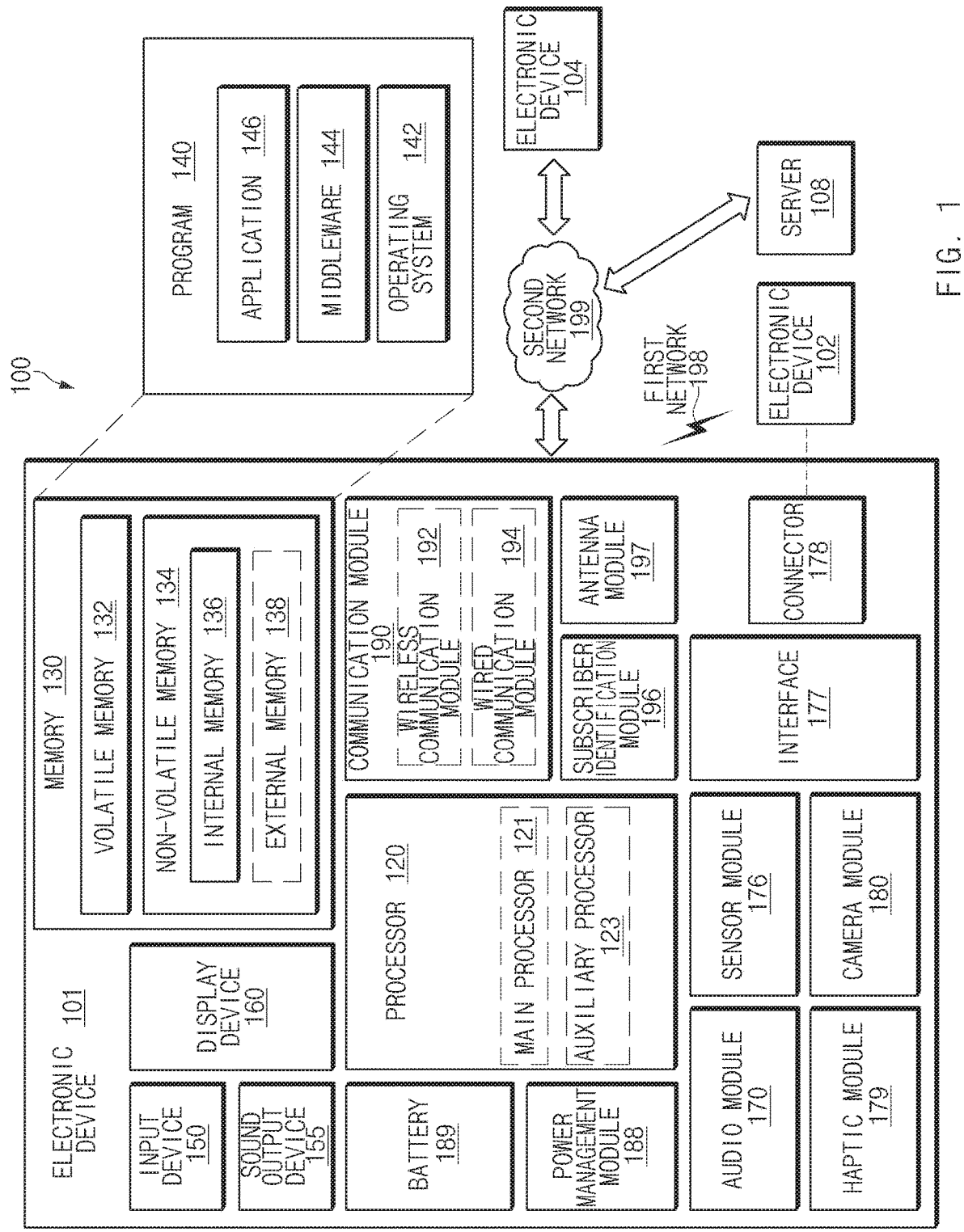
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of an integrated circuit (IC), for example, a power management IC (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
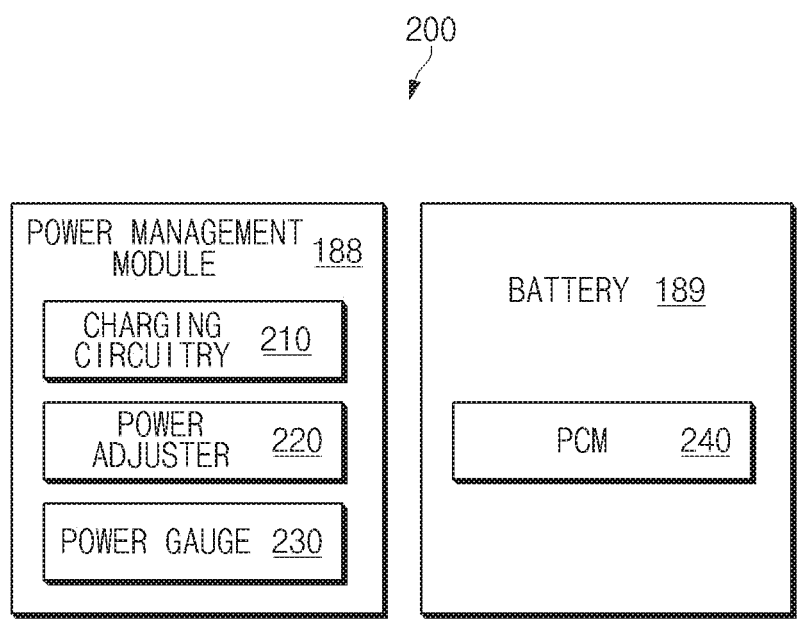
FIG. 2 is a block diagram illustrating a power management module and a battery according to an embodiment of the disclosure.

FIG. 2 is a block diagram illustrating a power management module and a battery according to an embodiment of the disclosure.

Referring to FIG. 2, a block diagram 200 illustrates that a power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power supplied from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
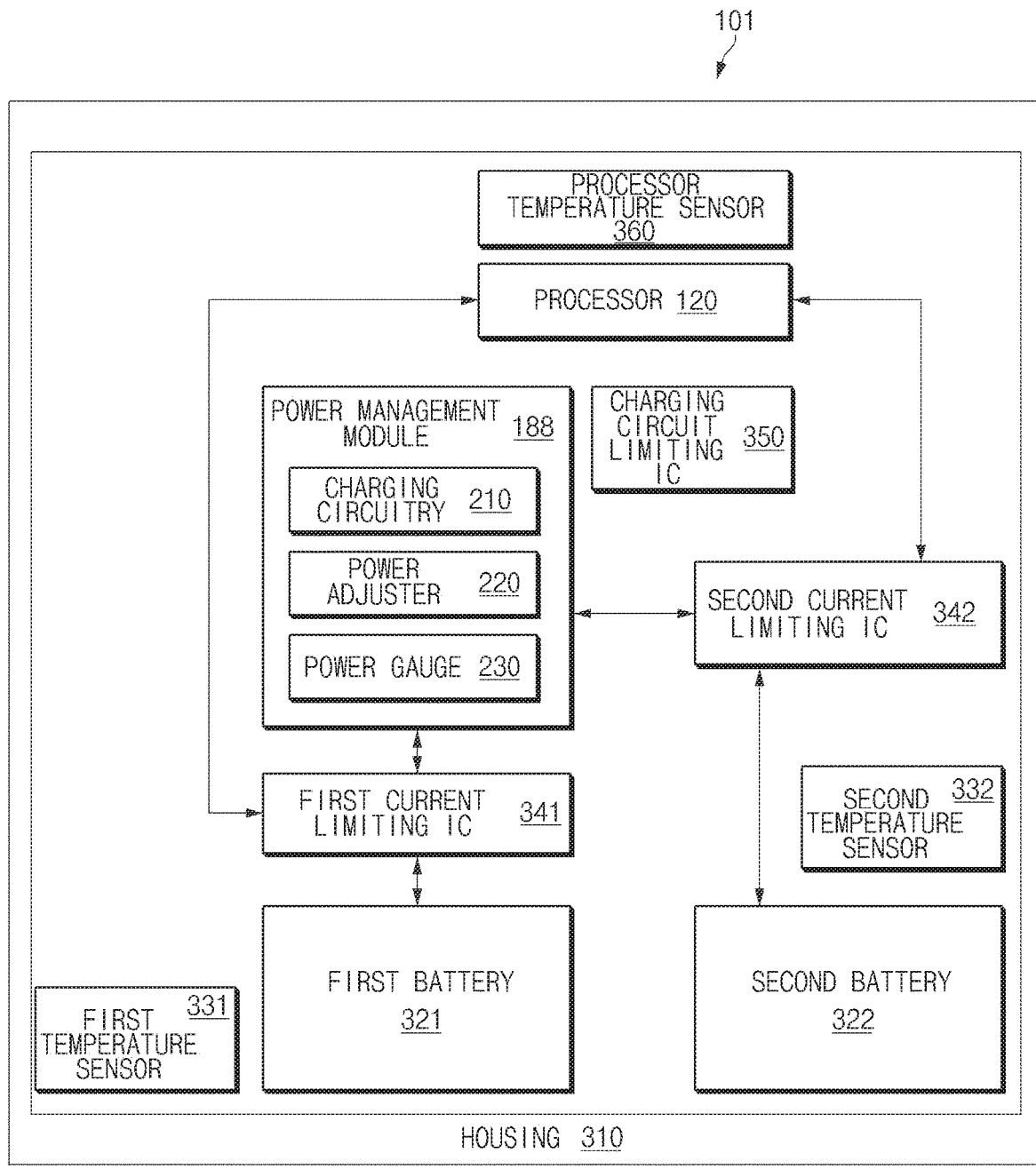
FIG. 3 is a block diagram illustrating an electronic device according to an embodiment of the disclosure.

FIG. 3 is a block diagram illustrating an electronic device according to an embodiment of the disclosure.

Referring to FIG. 3, in an embodiment, the electronic device 101 (e.g., the electronic device 101 of FIG. 1) may include a plurality of batteries 320, the power management module 188, a plurality of temperature sensors 330, a plurality of current limiting ICs 340, and the processor 120, arranged in a housing 310.

In an embodiment, the housing 310 may define an outline of the electronic device 101. The housing 310 may include a front plate that forms a front surface or a first surface of the electronic device 101, a back plate that forms a rear surface or a second surface of the electronic device 101, and a side member that surrounds a space between the front and back plates. The housing 310 may protect the plurality of batteries 320, the power management module 188, the plurality of temperature sensors 330, the plurality of current limiting ICs 340, and the processor 120 arranged therein from external impact.

In an embodiment, the plurality of batteries 320 may be arranged inside the housing 310. The plurality of batteries 320 may include a first battery 321 and a second battery 322. However, the embodiment is not limited thereto, and the plurality of batteries 320 may include three or more batteries. In this case, the electronic device 101 may operate as a multi-battery.

In an embodiment, each of the first and second batteries 321 and 322 may independently supply power necessary for the electronic device 101 to operate. Each of the first and second batteries 321 and 322 may be independently charged. The first and second batteries 321 and 322 may have different capacities, respectively. For example, the first battery 321 may be a main battery, and the second battery 322 may be a sub battery. The first and second batteries 321 and 322 may be discharged at different rates, respectively.

In an embodiment, the first and second batteries 321 and 322 may perform a balancing operation to match the battery levels of each other. When the first and second batteries 321 and 322 perform the balancing operation, a difference in battery level between the first and second batteries 321 and 322 may be reduced.

In an embodiment, the power management module 188 may include the charging circuitry (charger) 210, the power adjuster 220, and the power gauge 230. The power management module 188 may be implemented as a PMIC. The power management module 188 may control the plurality of batteries 320. For example, the power management module 188 may control the battery level of each of the first and second batteries 321 and 322. The power management module 188 may control the charging and/or discharging of each of the first and second batteries 321 and 322 to control the battery level of each of the first and second batteries 321 and 322. The power management module 188 may control the charging and/or discharging of each of the first and second batteries 321 and 322 by using the plurality of current limiting ICs 340.

In an embodiment, the plurality of current limiting ICs 340 may control the current flowing into the plurality of batteries 320. The plurality of current limiting ICs 340 may limit the maximum amount of current flowing into each of the plurality of batteries 320. The plurality of current limiting ICs 340 may include first and second current limiting ICs 341 and 342. However, the embodiment is not limited thereto, and when the electronic device 101 operates with a multi-battery, the plurality of current limiting ICs 340 may include three or more current limiting ICs.

In an embodiment, the first current limiting IC 341 may limit the current flowing into the first battery 321. The first current limiting IC 341 may set the first battery 321 to a charging state or a discharging state. The first current limiting IC 341 may limit the maximum intensity of the current flowing into the first battery 321 from the power management module 188 in the charging state. The first current limiting IC 341 may limit the balancing operation between the first battery 321 and the second battery 322 in the charging state. The first current limiting IC 341 may transmit, to the processor 120, information about a voltage of the first battery 321, a charging current flowing into the first battery 321, and/or a discharging current output from the first battery 321.

In an embodiment, the second current limiting IC 342 may limit the current flowing into the second battery 322. The second current limiting IC 342 may set the second battery 322 to the charging or discharging state. The second current limiting IC 342 may limit the maximum intensity of current flowing into the second battery 322 from the power management module 188 in the charging state. The second current limiting IC 342 may limit the balancing operation between the first and second batteries 321 and 322 in the charging state. The second current limiting IC 342 may transmit, to the processor 120, information about the voltage of the second battery 322, the charging current flowing into the second battery 322, and/or the discharging current output from the second battery 322.

In an embodiment, the processor 120 may be operationally connected with the plurality of batteries 320, the power management module 188, the plurality of temperature sensors 330, and the plurality of current limiting ICs 340. The processor 120 may obtain information about the plurality of batteries 320 through the charging circuitry 210 and the power gauge 230 of the power management module 188. For example, the processor 120 may know information about the sum of battery voltages, charging currents, discharging currents, and/or battery levels of the first and second batteries 321 and 322. The processor 120 may set the maximum intensities of the charging currents flowing into the first and second batteries 321 and 322 and/or whether to block the charging currents.

In an embodiment, according to the electronic device 101 employing a multi-battery structure, each battery may be charged independently in a parallel structure, thereby causing a difference between the charging times of batteries. In addition, the multi-batteries may be arranged in the electronic device 101 while being spaced apart from each other, so that a difference in temperature may occur depending on a using state and/or a surrounding environment of each battery.

In an embodiment, the electronic device 101 may be provided with temperature sensors 330 and 360 arranged at locations where temperature measurement and/or heating detection are/is required. When the electronic device 101 employs the multi-battery, the first and second temperature sensors 331 and 332 may be arranged adjacent to the first and second batteries 321 and 322 to measure the heating state of each battery. As another example, the electronic device 101 may be provided with the charging circuit temperature sensor which is arranged adjacent to the charging circuitry 210 to measure the temperature of the charging circuitry 210 that generates heat in the charging state. As still another example, the electronic device 101 may be provided with the processor temperature sensor 360 adjacent to the processor 120 to measure the temperature of the processor 120 whose temperature changes corresponding to the using amount.

In an embodiment, the processor 120 may combine temperature information obtained from the first and second temperature sensors 331 and 332, the charging circuit temperature sensor, and/or the processor temperature sensor 360. The processor 120 may control the current flowing into the first battery 321 and/or the second battery 322 based on the temperature measured by the first temperature sensor 331 and/or the second temperature sensor 332.

Figure 4:
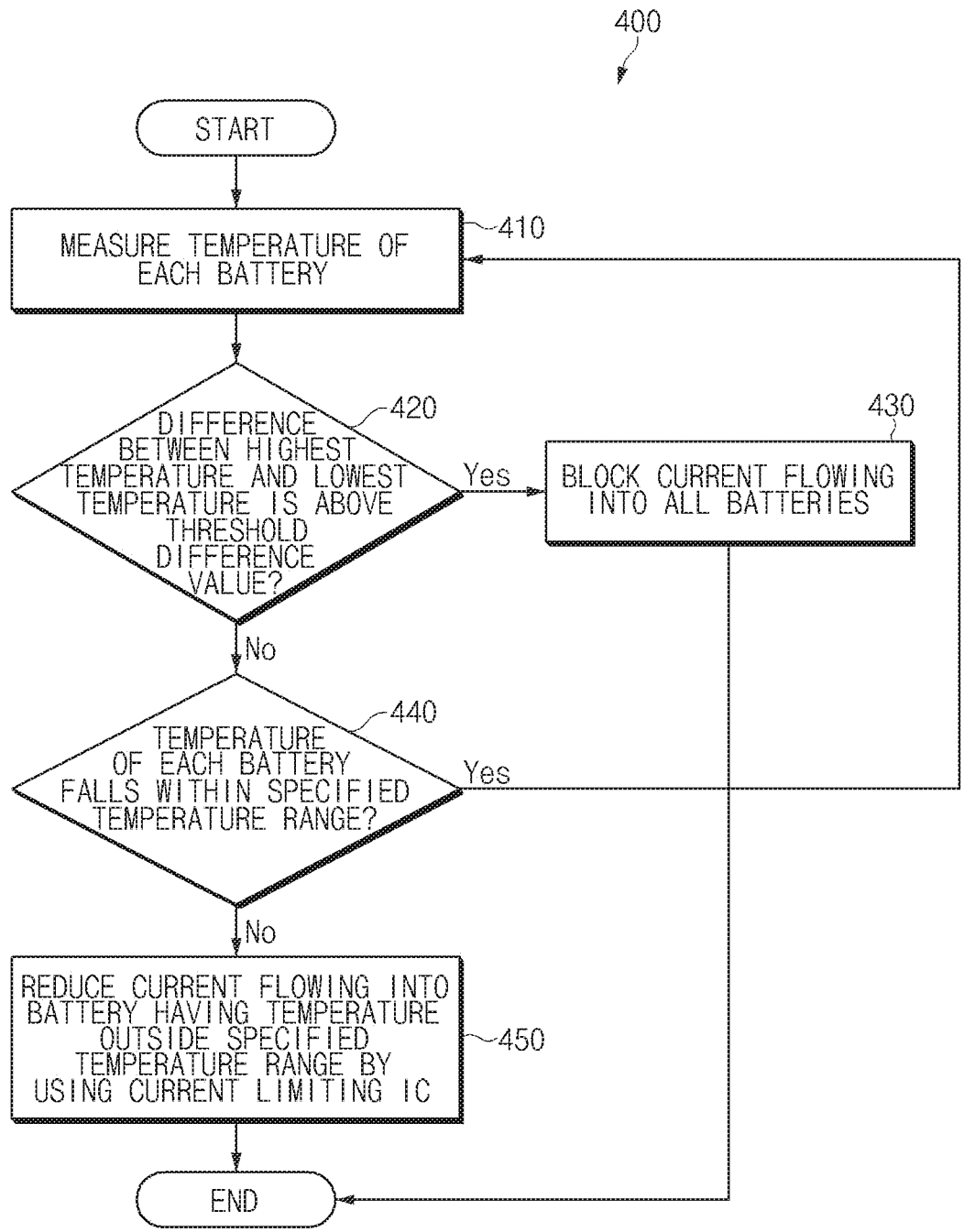
FIG. 4 is a flowchart illustrating a method of controlling charging by an electronic device according to an embodiment of the disclosure.

FIG. 4 is a flowchart illustrating a method of controlling charging by an electronic device according to an embodiment of the disclosure.

Figure 5:
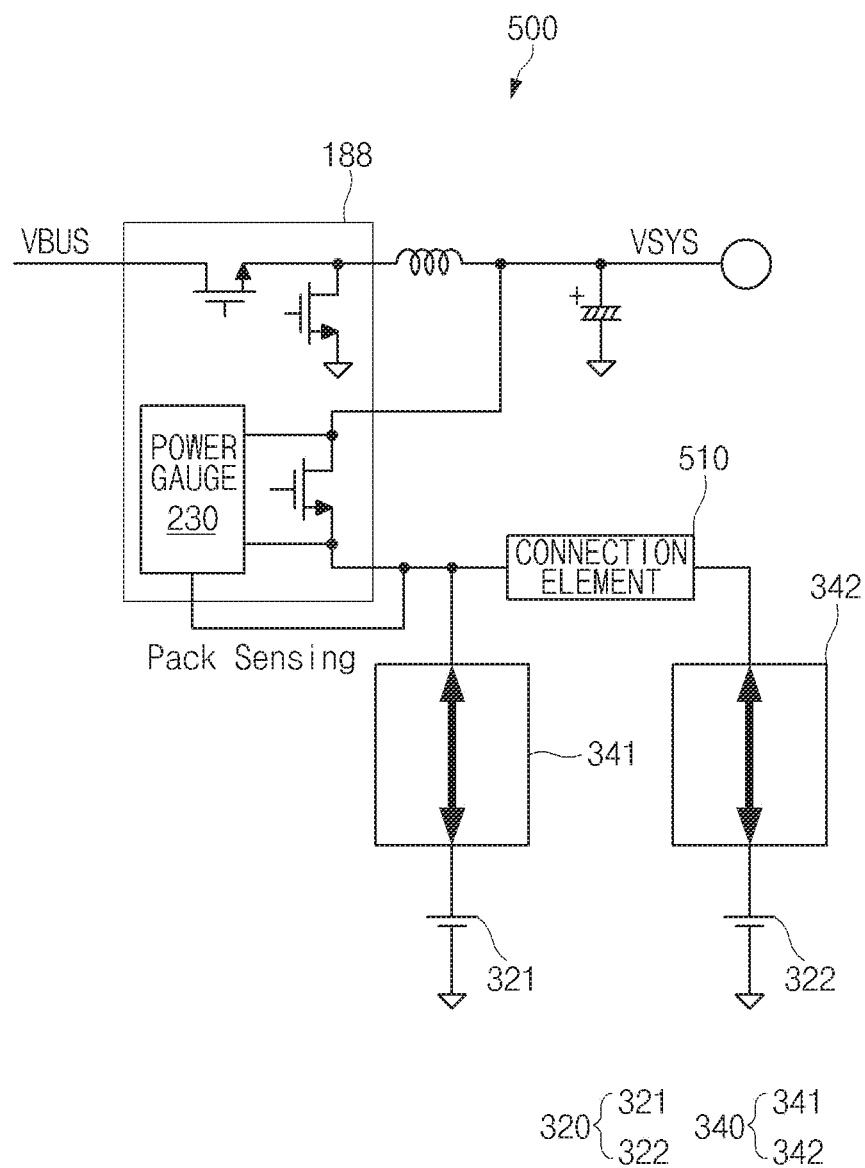
FIG. 5 is a circuit diagram illustrating an electronic device according to an embodiment of the disclosure.

Referring to FIG. 5 a flowchart 400 illustrates that the electronic device 101 according to an embodiment may control charging based on a temperature of each of a plurality of batteries (e.g., the plurality of batteries 320 of FIG. 3).

According to an embodiment, the temperatures of at least some of the plurality of batteries 320 of the electronic device (e.g., the electronic device 101 of FIG. 3) having a multi-battery structure may be out of the range which is specified by the usage scenario and the surrounding environment, or the temperature difference between the plurality of batteries 320 may be increased. The processor (e.g., the processor 120 of FIG. 3) of the electronic device 101 may perform heating control corresponding to a temperature change situation of the plurality of batteries 320. For example, the processor 120 may operate a heating control algorithm and/or a battery stabilization algorithm corresponding to a situation.

Referring to FIG. 4, in operation 410, the electronic device 101 may measure a temperature of each of the plurality of batteries 320. The temperatures of the plurality of batteries 320 may be measured by using the plurality of temperature sensors 330 adjacent to the plurality of batteries 320, respectively. For example, the first temperature sensor (e.g., the first temperature sensor 331 of FIG. 3) may measure the temperature of the first battery (e.g., the first battery 321 of FIG. 3), and the second temperature sensor (e.g., the second temperature sensor 332 of FIG. 3) may measure the temperature of the second battery (e.g., the second battery 322 of FIG. 3).

In operation 420, the electronic device 101 according to an embodiment may determine whether a difference between the highest temperature and the lowest temperature is greater than or equal to a threshold difference value. The highest temperature may be the highest of the measured temperatures of the plurality of batteries 320. The lowest temperature may be the lowest of the measured temperatures of the plurality of batteries 320. The threshold difference value may be a preset threshold value. For example, when the temperature of the first battery 321 is 30° C., the temperature of the second battery 322 is 60° C., and the processor 120 sets the threshold difference value to 20° C., the processor 120 may determine that the difference between the highest temperature and the lowest temperature is equal to or greater than the threshold difference value.

In operation 430, the electronic device 101 according to an embodiment may block currents flowing into all the batteries 320. When the difference between the highest temperature and the lowest temperature is equal to or greater than the threshold difference value, the processor 120 of the electronic device 101 may determine that all the batteries 320 are in an abnormal temperature state and may perform exceptional processing such as charging blockage. The processor 120 may block the currents flowing into all the batteries 320 by using a plurality of current limiting ICs (e.g., the plurality of current limiting ICs 340 of FIG. 3).

In operation 440, the electronic device 101 may determine whether the temperature of each of the plurality of batteries 320 has a temperature other than a specified temperature range or falls within the specified temperature range. When the difference between the highest temperature and the lowest temperature is less than the threshold difference value, the processor 120 of the electronic device 101 may individually determine whether the temperature of each of the plurality of batteries 320 has a temperature other than the specified temperature range or falls within the specified temperature range.

According to an embodiment, the electronic device 101 may designate a risk ranking and may preferentially determine whether a battery having a high risk ranking falls within the specified temperature range. The electronic device 101 may determine a temperature of each of the batteries 320 and give a high risk ranking to a battery having a large difference from a reference temperature. For example, when the reference temperature is 20° C., the temperature of the first battery 321 is 30° C., and the temperature of the second battery 322 is 40° C., the electronic device 101 may assign a first risk ranking to the second battery 322, and may preferentially determine whether the temperature of the second battery 322 falls within the specified temperature range. As another example, when the reference temperature is 20° C., the temperature of the first battery 321 is 0° C., and the temperature of the second battery 322 is 10° C., the electronic device 101 may assign the first risk ranking to the first battery 321, and may determine whether the first battery 321 falls within the specified temperature range. When the temperature of each of the plurality of batteries 320 falls within the specified temperature range (440—Yes), the processor 120 returns to operation 410 to periodically repeat the operation of measuring the temperature of each of the plurality of batteries 320.

In operation 450, the electronic device 101 according to an embodiment may reduce the intensity of the current flowing into the battery 321 and/or 322 having a temperature outside of the specified temperature range by using the current limiting ICs 341 and/or 342. When the temperature of at least one of the plurality of batteries 320 is out of the specified temperature range (440—No), the processor 120 of the electronic device 101 may reduce the charging current of the battery of the first battery 321 and/or the second battery 322, which is outside the specified temperature range. The processor 120 may reduce the intensity of the maximum current flowing into the first battery 321 and/or the second battery 322 by using a first current limiting IC (e.g., the first current limiting IC 341 of FIG. 3) and/or a second current limiting IC (e.g., the second current limiting IC 342 of FIG. 3).

FIG. 5 is a circuit diagram illustrating an electronic device (e.g., the electronic device 101 of FIG. 3) according to an embodiment of the disclosure.

Referring to FIG. 5, in an embodiment, a circuit diagram 500 illustrates that the electronic device 101 may include the plurality of batteries 320, the power management module 188, the plurality of current limiting ICs 340, and a connection element 510.

In an embodiment, the connection element 510 may be connected with the power management module 188 and the plurality of current limiting ICs 340. The connection element 510 may be arranged between the first current limiting IC 341 and the second current limiting IC 342. The connection element 510 may be implemented with a flexible printed circuit board (FPCB). The connection element 510 may control currents flowing between the power management module 188 and the plurality of current limiting ICs 340. The connection element 510 may control a current flowing between the first and second current limiting ICs 341 and 342.

In an embodiment, in the charging state in which the electronic device 101 is connected to an external power source, the charging current flowing into the first battery 321 from the external power source may be supplied to the first battery 321 through the first current limiting IC 341. The charging current flowing into the second battery 322 from an external power source may be supplied to the second battery 322 through the second current limiting IC 342.

In an embodiment, in the discharging state where the electronic device 101 is separated from an external power source, the discharging current of the first battery 321 supplied from the first battery 321 to a system power input terminal VSYS of the electronic device 101 may be output from the first battery 321 through the first current limiting IC 341. The discharging current of the second battery 322 supplied from the second battery 322 to the system power input terminal VSYS of the electronic device 101 may be output from the second battery 322 through the second current limiting IC 342.

In an embodiment, when the battery levels of the first and second batteries 321 and 322 connected in parallel to each other is different from each other, a balancing operation may occur in which a current flows from a high level side to a low lever side until the battery levels between the first and second batteries 321 and 322 match each other. When the balancing operation occurs, the side into which a current flows may be in the charged state. For example, when the capacity of the first battery 321 is 50% and the battery level of the second battery 322 is 70%, a current may flow from the second battery 322 to the first battery 321 by the balancing operation, so that the first battery 321 is charged. The balancing operation may reduce the difference in battery level between the first and second batteries 321 and 322, but power loss and heat loss may occur while the balancing operation is performed. The sum of battery capacities of the first and second batteries 321 and 322 may be reduced by performing the balancing operation. Thus, it may be preferable to minimize or block the balancing operation between the first and second batteries 321 and 322 in terms of the sum of the battery quantities of the first and second batteries 321 and 322.

In an embodiment, the processor (e.g., the processor 120 of FIG. 3) of the electronic device 101 may block the balancing operation to prevent the battery having a temperature outside the specified temperature range from being changed to a charging state. The processor 120 may block the balancing operation by using a current limiting IC connected to a battery having a temperature outside the specified temperature range. The processor 120 may block the balancing operation to prevent the battery having a temperature outside the specified temperature range from being overheated while being changed to a charging state.

In an embodiment of the disclosure, the processor 120 of the electronic device 101 may be set to reduce the intensity of a current flowing into a battery having a battery level equal to or greater than a reference level. The processor 120 may be set to reduce the intensity of a current flowing into the battery having the battery level equal to or greater than the reference level in order to increase the charging speed of the battery having a battery level below the reference level. For example, when the reference level is 80%, the capacity of the first battery 321 is 60%, and the battery level of the second battery 322 is 80%, the processor 120 may maintain the charging speed of the first battery 321 at a first speed, which is an existing charging speed, and change the charging speed of the second battery 322 to a second speed slower than the first speed.

In an embodiment, the processor 120 of the electronic device 101 may block the current flowing into a battery (e.g., the first battery 321) that is charged (e.g., fully charged) to a target voltage. The processor 120 may block the current flowing into the battery 321 charged to a target voltage to prevent heat from being generated when the battery 321 charged to the target voltage is maintained in the charging state or to prevent the battery level from being reduced while performing a balancing operation with other batteries. The processor 120 may block a current flowing into the battery 321 charged to the target voltage by using the current limiting circuit 341 connected to the battery 321 charged to the target voltage.

In an embodiment, when a battery (e.g., the second battery 322) before being charged to the target voltage is above the highest threshold temperature or below the lowest threshold temperature, the processor 120 of the electronic device 101 may block the current flowing into the battery 322 before being charged to the target voltage. When the battery 322 is above the highest threshold temperature or below the lowest threshold temperature, the processor 120 may immediately block the current flowing into the battery 322 regardless of whether the battery 322 is charged to a target voltage. The processor 120 may block the balancing operation between the batteries 321 and 322 to prevent the battery 322, of which the temperature is equal to or higher than the highest threshold temperature or equal to or lower than the lowest threshold temperature, from switching to a charging state. Because it is more important to prevent the battery 322, of which the temperature is equal to or higher than the highest threshold temperature or equal to or lower than the lowest threshold temperature, from breaking than to dissolve the battery level imbalance between the batteries 321 and 322, the processor 120 may block the balancing operation between the batteries 321 and 322 until the battery 322, of which the temperature is above the highest threshold temperature or below the lowest threshold temperature, has a temperature within a specified temperature range. The processor 120 may block the balancing operation between the batteries 321 and 322 by using the current limiting circuits 341 and 342 connected to the batteries 321 and 322.

Figure 6A:
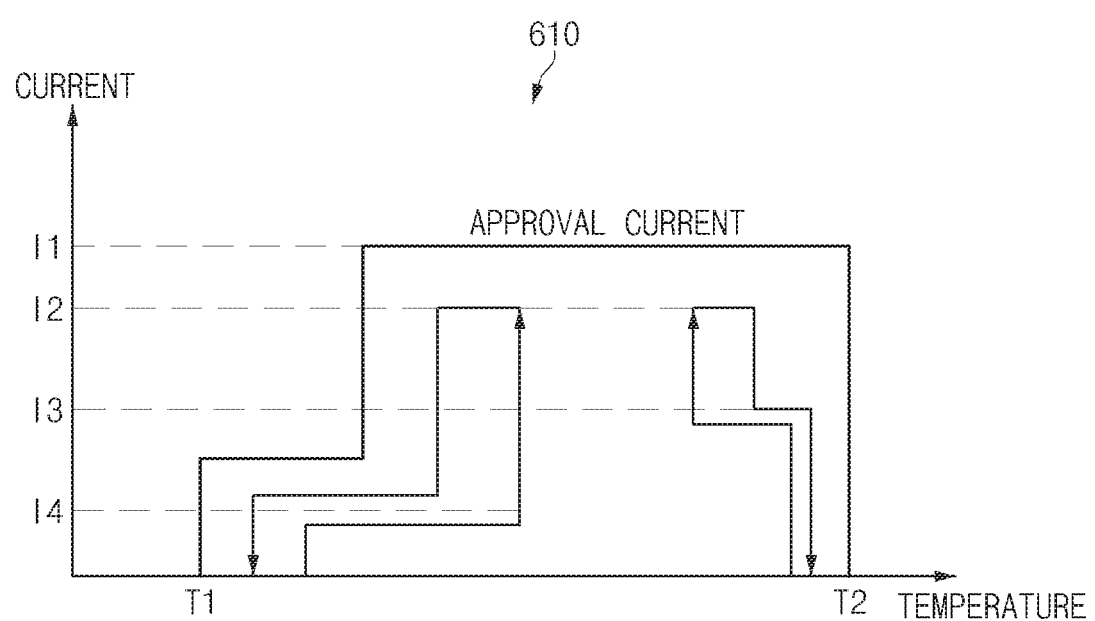
FIG. 6A is a current graph of an electronic device according to an embodiment of the disclosure.

FIG. 6A is a current graph of an electronic device according to an embodiment of the disclosure.

Figure 6B:
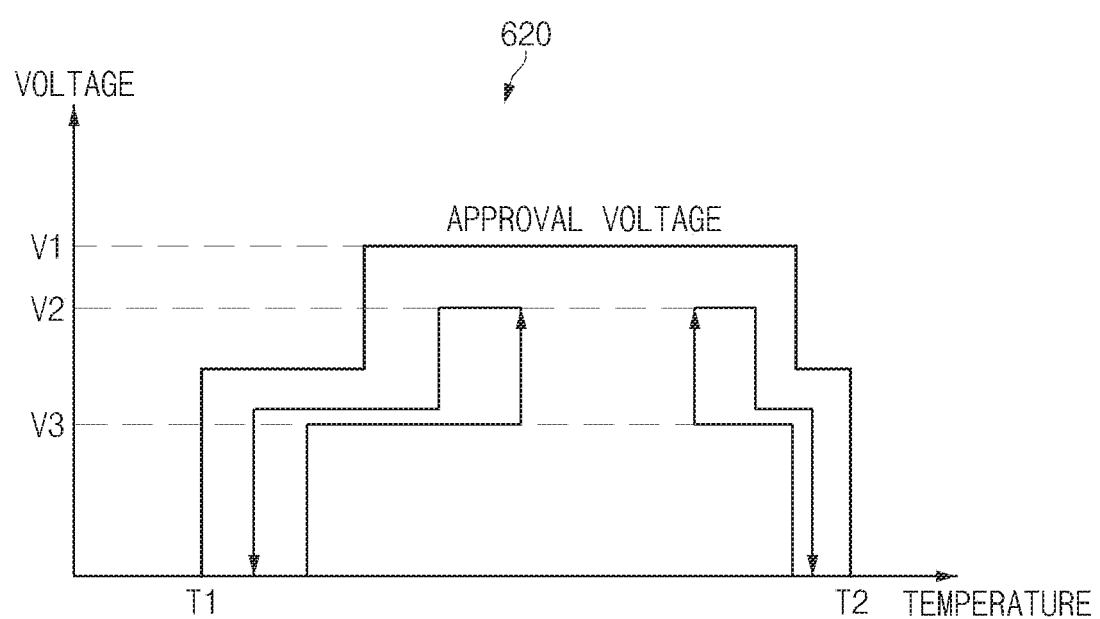
FIG. 6B is a voltage graph of the electronic device according to an embodiment of the disclosure.

FIG. 6B is a voltage graph of an electronic device according to an embodiment of the disclosure.

Referring to FIGS. 6A and 6B, a current graph 610 and a voltage graph 620 of the electronic device 101 illustrate the relationship between the temperature, the approved current and the approved voltage of a battery (e.g., the first battery 321 of FIG. 3) of the electronic device 101.

In an embodiment, the approved current and the approved voltage according to the temperature may be set to the battery 321. The temperature range in which the battery 321 may operate may be set from a first temperature T1 to a second temperature T2. The battery 321 may have different approval currents and approval voltages for each temperature section in the range of the first temperature T1 to the second temperature T2. For example, when the maximum approval current of the battery 321 is a first current I1 and the maximum approval voltage is a first voltage V1, the battery 321 may have an approval current and an approval voltage, which are smaller than the first current I1 and the first voltage V1, in a temperature section adjacent to the first temperature T1.

In an embodiment, the battery 321 may have different charging current and discharging current corresponding to the temperature. For example, when the temperature of the battery 321 falls in an intermediate section between the first temperature T1 and the second temperature T2, the intensity of the charging current and/or the discharging current increases to a second current I2. As another example, when the temperature of the battery 321 is adjacent to the first temperature T1 or the second temperature T2, the intensities of the charging current and the discharging current decrease to a third current I3 or a fourth current I4.

In an embodiment, the battery 321 may have different charging and discharging voltages depending on the temperature. For example, when the temperature of the battery 321 falls in the intermediate section between the first temperature T1 and the second temperature T2, the intensities of the charging current and/or the discharging current increase to a second voltage V2. As another example, when the temperature of the battery 321 is adjacent to the first temperature T1 or the second temperature T2, the intensities of the charging current and the discharging current may decrease to the third voltage V3.

Figure 7:
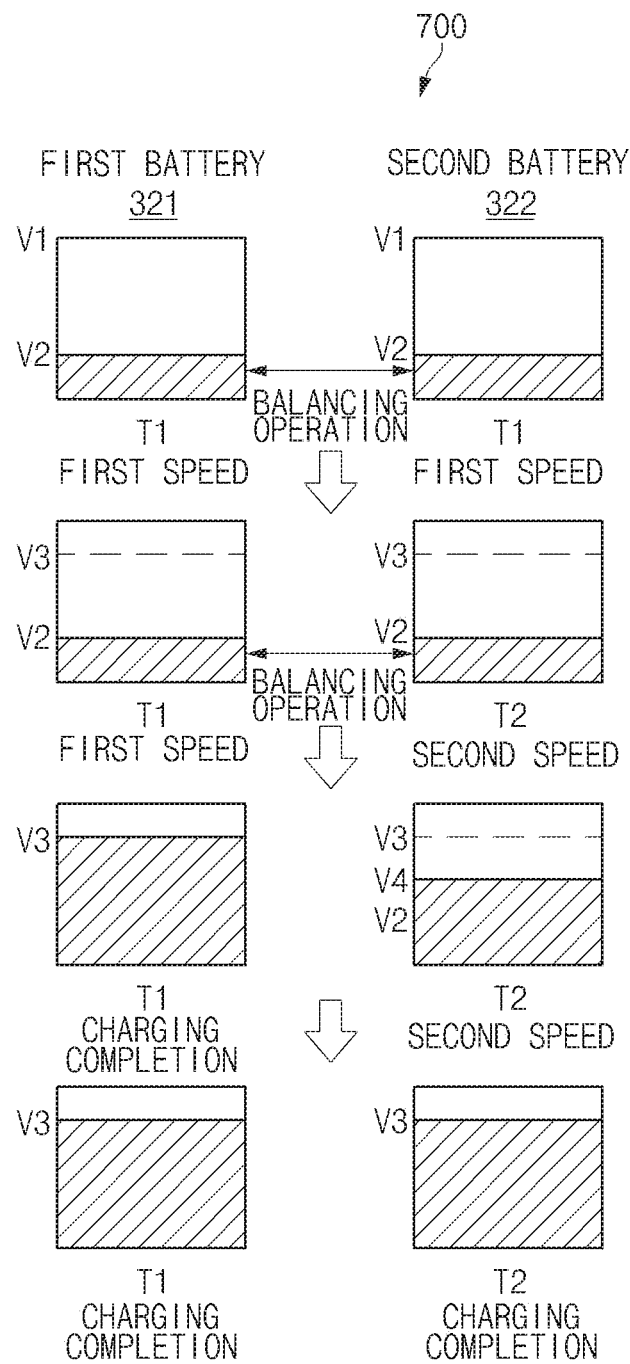
FIG. 7 is a diagram illustrating charging of a first battery and a second battery according to an embodiment of the disclosure.

FIG. 7 is a diagram illustrating charging of a first battery and a second battery according to an embodiment of the disclosure.

Referring to FIG. 7, a diagram 700 illustrates a charging state of the first and second batteries 321 and 322 may change corresponding to temperature.

In an embodiment, the first and second batteries 321 and 322 may have a maximum battery level at the first voltage V1. The first and second batteries 321 and 322 may have the second voltage V2 at the initial stage. When the battery capacities are different from each other, the battery levels may be different from each other under the same second voltage V2. When the battery levels are different, a balancing operation may occur to reduce the difference between the battery levels.

In an embodiment, as a battery full charge level of each of the first battery 321 and the second battery 322, the third voltage V3 smaller than the first voltage V1 may be set. For example, 90% of the maximum battery levels of the first battery 321 and the second battery 322 may be set as the battery full charge levels. When the first battery 321 and/or the second battery 322 are charged to full charge levels, the processor 120 of the electronic device 101 may use a first current limiting IC (e.g., the first current limiting IC 341 of FIG. 3) and/or a second current limiting IC (e.g., the second current limiting IC 342 of FIG. 3) to block the introduction of additional current.

In an embodiment, the temperature of the first battery 321 or the second battery 322 may change corresponding to the use state of the electronic device 101 and/or the surrounding environment. For example, the temperature of the second battery 322 may change from the first temperature T1 to the second temperature T2. The first temperature T1 may be the room temperature, and the second temperature T2 may be a temperature outside the first temperature T1 which is the room temperature than.

In an embodiment, the processor (e.g., the processor 120 of FIG. 3) of the electronic device 101 may allow the first and second batteries 321 and 322 to be charged at different speeds by using the power management module 188, the first current limiting IC 341, and/or the second current limiting IC 342. For example, the processor 120 may allow the first battery 321 to be charged at a first speed and the second battery 322 to be charged at a second speed slower than the first speed, thereby preventing the second battery 322 from being damaged due to heat generation.

In an embodiment, the processor 120 of the electronic device 101 may block charging of the battery charged up to the third voltage V3. When the first battery 321 is first charged to the third voltage V3, the processor 120 may block charging of the first battery 321. The processor 120 may block a current flowing into the first battery 321. The processor 120 may block the balancing operation to prevent the first battery 321 from being discharged due to the balancing operations of the first and second batteries 321 and 322.

In an embodiment, the electronic device 101 may maintain the charging speed of the second battery 322 at the second speed while the second battery 322 is charged to the third voltage V3 via a fourth voltage V4.

According to various embodiments, an electronic device (e.g., the electronic device 101 of FIG. 3) includes a housing (e.g., the housing 310 of FIG. 3), a plurality of batteries (e.g., the plurality of batteries 320 of FIG. 3) arranged in the housing 310, a power management module (e.g., the power management module 188 of FIG. 3) that controls the plurality of batteries 320, a plurality of temperature sensors (e.g., the plurality of temperature sensors 330) that measure temperatures of the plurality of batteries 330, respectively, a plurality of current limiting ICs (e.g., the plurality of current limiting ICs 340) that limit a maximum intensity of current flowing into each of the plurality of batteries 320, and a processor (e.g., the processor 120 of FIG. 3) that is operationally connected to the plurality of batteries 320, the power management module 188, the plurality of temperature sensors 330, and the plurality of current limiting ICs 340, wherein the processor 120 may determine whether a temperature of each of the plurality of batteries 320 is outside a specified temperature range, and reduce an intensity of a current flowing into a battery (e.g., the first battery 321 of FIG. 3) of the plurality of batteries 320 that has a temperature outside the specified temperature range by using the plurality of current limiting ICs 340.

In an embodiment, the processor 120 may identify a highest temperature and a lowest temperature of the sensed temperatures, and block currents flowing into the plurality of batteries 320 by using the plurality of current limiting ICs 340 when a difference value between the highest and lowest temperatures is equal to or greater than a threshold difference value.

In an embodiment, the processor 120 may block currents flowing into the plurality of batteries 320 by using the plurality of current limiting ICs 340 when at least one of the sensed temperatures is equal to or higher than a highest threshold temperature or is equal to or lower than a lowest threshold temperature.

In an embodiment, the processor 120 may measure a battery level of each of the plurality of batteries 320, and reduce an intensity of a current flowing into a battery having a battery level equal to or greater than a reference level among the plurality of batteries 320 by using the plurality of current limiting ICs 340.

In an embodiment, the processor 120 may block a current flowing into a battery 321 and/or 322 charged to a target voltage among the plurality of batteries 320.

In an embodiment, the processor 120 may individually control a charging speed of each of the plurality of batteries 320 based on a temperature of each of the plurality of batteries 320 in a charging state in which the electronic device is connected to an external power source.

In an embodiment, the processor 120 may block performing a balancing operation for reducing differences between battery levels of the plurality of batteries 320 by using the plurality of current limiting ICs 340 connected to batteries 321 and/or 322 that have temperatures outside the specified temperature range in a charging state in which the electronic device is connected to an external power source.

In an embodiment, the processor 120 may block performing a balancing operation for reducing differences between battery levels of the plurality of batteries when at least one of the sensed temperatures is equal to or higher than a highest threshold temperature or is equal to or lower than a lowest threshold temperature in a discharging state where the electronic device is separated from an external power source.

According to various embodiments, a method of controlling charging of a plurality of batteries 320 includes measuring temperatures of the plurality of batteries, respectively by using the plurality of temperature sensors 330 (e.g., operation 410 of FIG. 4), determining whether the temperature of each of the plurality of batteries 320 is outside a specified temperature range (e.g., operation 420 of FIG. 4), and reducing an intensity of a current flowing into the battery 321 and/or 322 of the plurality of batteries 320 that has a temperature outside the specified temperature range by using the plurality of current limiting ICs 340 for limiting a maximum intensity of a current flowing into each of the plurality of batteries 320 (e.g., operation 450 of FIG. 4).

According to various embodiments, the electronic device 101 includes the housing 310, the plurality of batteries 320 arranged in the housing 310, the power management module 188 that controls the plurality of batteries 320, the plurality of temperature sensors 330 that measures temperatures of the plurality of batteries 320, respectively, the plurality of current limiting ICs 340 that limits a maximum intensity of current flowing into each of the plurality of batteries 320, and the processor 120 that is operationally connected to the plurality of batteries 320, the power management module 188, the plurality of temperature sensors 330, and the plurality of current limiting ICs 340, wherein the processor 120 may charge the battery 321 and/or 322 having a temperature within a specified temperature range among the plurality of batteries 320 at a first speed, charge the battery 321 and/or 322 having a temperature outside the specified temperature range among the plurality of batteries 320 at a second speed slower than the first speed by using the plurality of current limiting ICs 340, and block charging by using the plurality of current limiting ICs 340 when a difference value between a highest temperature and a lowest temperature of the plurality of batteries 320 is equal to or greater than a threshold difference value.

In an embodiment, the processor 120 may reduce a charging speed of the battery 321 and/or 322 having a battery level equal to or higher than a reference level among the plurality of batteries 320 by using the plurality of current limiting ICs 340.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, it is possible to control the charging of each of the plurality of batteries.

According to the embodiments of the disclosure, it is possible to control the charging based on the temperature of each of the plurality of batteries.

In addition, various effects that are directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a first battery and a second battery arranged in the housing;
   a power management circuit configured to control the first battery and the second battery;
   a first temperature sensor configured to measure a first temperature of the first battery;
   a second temperature sensor configured to measure a second temperature of the second battery;
   a first current limiting integrated circuit (IC) configured to limit a maximum magnitude of a first current flowing into the first battery;
   a second current limiting IC configured to limit a maximum magnitude of a second current flowing into the second battery; and
   a processor configured to:
      determine whether each of the first temperature and the second temperature is outside a specified temperature range,
      when the first temperature is outside of the specified temperature range, control the first current limiting IC to reduce a magnitude of the first current while maintaining a magnitude of the second current,
      identify a highest temperature and a lowest temperature of the first temperature and the second temperature, and
      when a difference value between the highest temperature and the lowest temperature is equal to or greater than a threshold difference value, block the first current from flowing into the first battery and block the second current from flowing into the second battery.

2. The electronic device of claim 1, wherein the processor is further configured to:
   when the first temperature is equal to or higher than a highest threshold temperature or is equal to or lower than a lowest threshold temperature, block the first current from flowing into the first battery and block the second current from flowing into the second battery.

3. The electronic device of claim 1, wherein the processor is further configured to:
   measure a first battery level of the first battery, and
   determine whether the first battery level is greater than a reference level,
   when the first battery level is greater than the reference level, reduce the magnitude of the first current.

4. The electronic device of claim 1, wherein the processor is further configured to:
   determine whether the first battery is charged to a target voltage, and
   when the first battery is charged to the target voltage, block the first current flowing into the first battery.

5. The electronic device of claim 1, wherein the processor is further configured to:
   when the electronic device is connected to an external power source, control a first charging rate of the first battery based on the first temperature and control a second charging rate of the second battery based on the second temperature.

6. The electronic device of claim 1, wherein the processor is further configured to:
   when the electronic device is connected to an external power source in a charging state and both the first temperature and the second temperature are outside of the specified temperature range, control the first current limiting IC and the second current limiting IC to reduce a difference between a battery level of the first battery and a battery level of the second battery.

7. The electronic device of claim 1, wherein the processor is further configured to:
   when the electronic device is separated from an external power source in a discharging state and the first temperature is equal to or higher than a highest threshold temperature or is equal to or lower than a lowest threshold temperature, block performing a balancing operation for reducing a difference between battery levels of the first battery and the second battery.

8. A method of controlling charging batteries of an electronic device, the method comprising: measuring a first temperature of a first battery and a second temperature of a second battery; determining whether each of the first temperature and the second temperature is outside a specified temperature range; and when the first temperature is outside of the specified temperature range, reducing a magnitude of a first current flowing into the first battery while maintaining a magnitude of the second current,
   identifying a highest temperature and a lowest temperature of the first temperature and the second temperature; and
   when a difference between the highest and lowest temperatures is equal to or greater than a threshold difference value, blocking the first current from flowing into the first battery and blocking a second current from flowing into the second battery.

9. The method of claim 8, further comprising:
   when the first temperature is equal to or higher than a highest threshold temperature or is equal to or lower than a lowest threshold temperature, blocking the first current from flowing into the first battery and blocking a second current from flowing into the second battery.

10. The method of claim 8, further comprising:
    measuring a first battery level of the first battery;
    determining whether the first battery level is greater than a reference level; and
    when the first battery level is greater than the reference level, reducing the magnitude of the first current.

11. The method of claim 8, further comprising:
    when the electronic device is connected to an external power source and the second battery is within the specified temperature range, charging the second battery at a first rate and charging the first battery at a second rate slower than the first rate.

12. The method of claim 8, further comprising:
    when the electronic device is connected to an external power source and both the first temperature and the second temperature are outside of the specified temperature range, controlling a first current limiting integrated circuit (IC) and a second current limiting IC to reduce a difference between a battery level of the first battery and a battery level of the second battery.

13. The method of claim 8, further comprising:
    when the electronic device is separated from an external power source in a discharging state and the first temperature is equal to or higher than a highest threshold temperature or is equal to or lower than a lowest threshold temperature, blocking performing a balancing operation for reducing a difference between battery levels of the first battery and the second battery.

14. An electronic device comprising:
a housing;
a first battery and a second battery arranged in the housing;
a power management circuit configured to control the first battery and the second battery;
a first temperature sensor configured to measure a first temperature of the first battery;
a second temperature sensor configured to measure a second temperature of the second battery;
a first current limiting integrated circuit (IC) configured to limit a maximum magnitude of a first current flowing into the first battery;
a second current limiting IC configured to limit a maximum magnitude of a second current flowing into the second battery; and
a processor configured to:
  determine whether each of the first temperature and the second temperature is within a specified temperature range,
  when the first temperature is within the specified temperature range,
  charge the first battery at a first rate,
  when the second temperature is outside of the specified temperature range, charge the second battery at a second rate slower than the first rate by using the second current limiting IC while maintaining a charging rate of the first battery,
  when a difference between the first temperature and the second temperature is equal to or greater than a threshold difference value, block charging by using the first current limiting IC and the second current limiting IC, and
wherein the processor is further configured to: when the first temperature is equal to or higher than a highest threshold temperature or is equal to or lower than a lowest threshold temperature, block the first current from flowing into the first battery and a second current from flowing into the second battery.

15. The electronic device of claim 14, wherein the processor is further configured to:
when the first battery is charged to a target voltage, block charging of the first battery using the first current limiting IC.

16. The electronic device of claim 14, wherein the processor is further configured to:
when the first temperature and the second temperature are outside the specified temperature range, block performing a balancing operation for reducing a difference between a battery level of the first battery and a battery level of the second battery.

17. The electronic device of claim 16, wherein the processor is further configured to:
when the first battery has a battery level equal to or higher than a reference level control the first current limiting IC to reduce a charging rate of the first battery.

* * * * *